United States Patent Office 3,294,488
Patented Dec. 27, 1966

3,294,488
PURIFICATION OF HYDROGEN PEROXIDE
Arthur K. Dunlop and Robert E. Meeker, Berkeley, and Gino J. Pierotti, El Cerrito, Calif., assignors to Shell Oil Company, a corporation of Delaware
No Drawing. Filed Feb. 11, 1958, Ser. No. 714,510
3 Claims. (Cl. 23—207)

This invention relates to the removal of impurities from aqueous hydrogen peroxide solutions. It deals with a new and more advantageous method of purifying hydrogen peroxide of acidic impurities.

For most of the commercial uses of hydrogen peroxide a product of high purity is required. To meet this high product purity requirement various impurities must be removed depending upon the method of hydrogen peroxide manufacture employed. Hydrogen peroxide made by electrolysis of bisulfate solutions, for instance, contains only inorganic impurities and is relatively easy to purify. More recently methods of producing hydrogen peroxide by oxidizing selected organic compounds have gained favor. Oxidation of anthraquinhydrones such as 2-ethyl-anthraquinhydrone or azosubstituted aromatic hydrocarbons such as hydrazobenzene, or normally gaseous hydrocarbons, or alcohols, particularly secondary alcohols such as isopropyl alcohol are examples of such methods of producing hydrogen peroxide which are disclosed in the following patents, among others: Riedl et al., U.S. 2,158,525; Lacomble, U.S. 2,376,257; Harris, U.S. 2,479,111; Rust, British 708,339, and Ornhjelm, Canadian 539,369. In all of these methods hydrogen peroxide contaminated with organic impurities is obtained and the purification problem is made more difficult. These organic impurities include significant amounts of organic acids especially lower aliphatic carboxylic acids such as formic and acetic acids which it is essential to remove in order to produce hydrogen peroxide of highest quality.

An important object of the present invention is the provision of an efficient method for removing acid impurities from aqueous hydrogen peroxide. A special object is to provide a method for purifying crude hydrogen peroxide solutions obtained in the course of production of hydrogen peroxide by oxidation of organic compounds. A further object is provision of a method for removing lower aliphatic carboxylic acids and peracids from aqueous hydrogen peroxide contaminated therewith. Still other objects and advantages of the process of the invention will be apparent from the following description of the new method in some of its preferred modifications which are intended to be illustrative only and not restrictive of the invention.

In accordance with the present invention aqueous hydrogen peroxide containing acid impurity is purified by contact with anion exchange resin in bicarbonate salt form. This method of acid removal has the advantage that very complete removal of acid can be achieved without danger of loss of hydrogen peroxide through decomposition.

In carrying out the process of the invention it is desirable to use an anion exchange resin which is resistant to attack by the hydrogen peroxide solution under the conditions used for the purification. It is necessary to employ a strong base resin of the quaternary ammonium salt type as distinguished from the weak base resins (primary, secondary and tertiary amine type resins) normally used for removing unionized acids from aqueous solutions. Also, carboxylic acid removal is more complete with strong base resin. Examples of strong base resins which are advantageously used in the process are the products of amination with trimethyl amine, for instance, of a chloromethylated styrene-divinyl benzene copolymer as described in U.S. 2,591,573 and sold by Rohm and Haas under the trade names "Amberlite IRA-400" and "Amberlite IRA-401"; anion exchange resins made by the process of U.S. 2,388,235 and the resins sold by Dow Chemical Company under the trade names "Dowex 1," "Dowex 2," and "Dowex 21K" or by National Aluminate Corporation under the trade name "Nalcit SBR" or the like. Duolite A42, A101 and A102, made by Chemical Process Company, Redwood City, California, are other anion exchange resins suitable for use in the new process.

These strong base resins cannot be used in the free base form because the high pH would lead to undesirable hydrogen peroxide decomposition during the purification. This is avoided in the process of the invention by using the anion exchange resin in bicarbonate salt form.

The bicarbonate salts of the anion exchange resins have outstanding advantage over any other salt form. Not only do these salts make it easy to maintain the pH of the hydrogen peroxide in the desired range below about 6.5 which is desirable for maximum stability but also these salts avoid introduction of other impurities into the peroxide solution. By use of this salt, acid impurities in the hydrogen peroxide are exchanged for bicarbonate which is eliminated from the solution as carbon dioxide using the hydrion of the acid being removed. The net reaction is conversion of the bicarbonate salt regenerant to carbon dioxide which is volatilized and salts of the acid impurities in the peroxide which salts are led off in the regeneration of the anion exchange resin. The reaction of the resin salt can be written.

where resin represents the anion exchange resin and X is the anion of the acid being removed, e.g., $H_2PO_4^-$ in the case of phosphoric acid or

in the case of carboxylic acids where R is hydrogen or an organic radical, for example, a lower alkyl radical. Thus the exchange is driven to completion through removal of the product $HCO_3^-$ ion via release of gaseous carbon dioxide. The only products put into the hydrogen peroxide solution are water and a very small amount of $CO_2$. This is in contrast to other salt forms of the resins which introduce an equivalent of acid for each equivalent removed.

With this especially advantageous modification of the invention control of the pH in the range of about 3 to about 8 which is desirable for limiting hydrogen peroxide decomposition is easily accomplished by controlling the partial pressure of carbon dioxide in the system. Operation at a pH of from 4 to 6.5 is particularly advantageous. The pH's here referred to are those measured in the exit stream and refer to the true pH of the peroxide solution which requires application of a correction to glass electrode readings in hydrogen peroxide solutions as pointed out by J. R. Kolczynski et al. in the Journal of the American Chemical Society, vol. 79, page 531 (1957). Only a small partial pressure of carbon dioxide is necessary for this pH control, the $CO_2$ generated in the exchange reaction being generally adequate when carrying out the purification at the preferred temperatures of about 25° C. or below. It is usually desirable, however, to carry out the purification with a small amount of added carbon dioxide even at these preferred low temperatures of operation in order to provide against undesirable rise in pH with accompanying loss of hydrogen peroxide should there be an interruption in the flow of solution through the resin or non-uniform distribution of solution on the resin so that $CO_2$ generation by exchange is inadequate to maintain the desired buffering action. The partial pressure of carbon dioxide which will be most desirable will depend upon the temperature, composition of the hydrogen peroxide feed particularly with respect to the nature and amount of salt therein, and on the pH which it has been decided to maintain. The lower the pH desired or the higher the temperature, or the higher the salt content, the higher will be the carbon dioxide partial pressure required under otherwise similar conditions. For instance with one salt-containing feed containing 0.08 N organic acids, the $CO_2$ generated by the exchange at 40° C. maintained the pH at 6.4, while additional $CO_2$, partial pressure about 0.25 atmosphere, lowered the pH to 5.5.

As the temperature is increased the life of the anion exchange resin decreases so it is desirable to carry out the purification at temperatures below 80° C. and more advantageously below 40° C. The preferred temperature is between the freezing point of the hydrogen peroxide and about 30° C., most preferably between about 10° and about 25° C.

The time of contact of the hydrogen peroxide solution with anion exchange resin bicarbonate salt can vary widely. Excessively long times of contact which lead to undesirably short resin life per volume of hydrogen peroxide treated due to attack on the resin by the peroxide are of course to be avoided especially since relatively short times of contact are sufficient in order to secure adequate removal of acid impurities. Thus times of the order of about 10 sec. to about 1 hour are suitable and more preferably times of about ½ to about 15 minutes are used.

The hydrogen peroxide solution to be purified can be contacted with the anion exchange resin bicarbonate salt in different ways. One simple method is to stir a slurry of the resin salt and hydrogen peroxide solution in which about 10 to about 50 parts by weight of resin salt are used per 100 parts of solution for a time as indicated above, then separating the solution from the resin by decantation, filtration or centrifugation. During contacting, the pH should be maintained in the proper range by application of an appropriate partial pressure of $CO_2$ as by bubbling the gas through the slurry. More advantageously the anion exchange resin in bead or other particulate form is used as a bed through which the hydrogen peroxide solution to be purified is passed. The solution can be contacted with the resin bed by upward or downward flow. The carbon dioxide and any oxygen from trace decomposition of hydrogen peroxide released sometimes tends to cause channelling and, consequently, poor operation. This can be minimized by operating under pressure sufficient to keep the carbon dioxide dissolved. The problem can be completely overcome by dispersing the solution over the bed as a downwardly flowing stream using a gas for dispersion of the solution as a relatively thin film over the resin surface. This gas should be inert under the conditions employed. The required amount of carbon dioxide for maintaining the desired pH can be added with the dispersing gas which may be air, nitrogen or the like. Alternatively, flooded bed operation using a down flow liquid rate sufficient to sweep gas down through the bed, e.g., 5 to 7 feet or more per hour, can be used with good results. Similar methods of operation without addition of carbon dioxide can also be employed by using high space velocities and uninterrupted operation but addition of carbon dioxide is more advantageous.

The removal of acids in this way can be effected essentially quantitatively and a rather sharp breakthrough of acids occurs due to use of the anion exchange resin in bicarbonate form. A high degree of utilization of resin capacity is also realized. Upon or just before such breakthrough the resin can be regenerated and used again in the process of the invention through many cycles so the cost of resin in the process is very low.

The anion exchange resin can be regenerated in various ways. For example, the regeneration can be carried out with a solution of a salt of carbonic acid so as to make the bicarbonate salt directly. Sodium bicarbonate, for example, is a suitable salt for regeneration in this way. Alternatively, the resin can be treated with base in the usual way to convert it to the free hydroxide form which can then be washed with a solution of carbonic acid or with water and $CO_2$ gas in excess of its water solubility to make the desired bicarbonate salt. However, as a general rule it is preferred to carry out regeneration of the exhausted resin with a sodium carbonate solution, followed by washing with $CO_2$ and water to convert the carbonate salt to the bicarbonate resin salt since more complete regeneration can usually be obtained in this way.

The process can be carried out with impure hydrogen peroxide solutions of any hydrogen peroxide concentration. With hydrogen peroxide solutions of 90% weight concentration or higher there is a definite detonation hazard which should be guarded against. With an initial peroxide concentration of 49% weight or more, detonations are still possible if the resin has become so thoroughly degraded by excessive service that it is capable of forming a homogeneous solution with the peroxide solution being treated. Therefore, solutions of not more than about 50% weight hydrogen peroxide are preferably used in the process. The process is especially advantageous for the purification of hydrogen peroxide containing a minor amount, i.e., less than about 0.5 N, preferably between about 0.01 N and about 0.1 N of acid impurities. Most desirably the hydrogen peroxide solution to be purified is free or substantially free of ions which catalyze hydrogen decomposition particularly ions of iron or other heavy metals. Removal of such ions markedly increases the effective life of the anion exchange resin employed in the process of the invention. U.S. Patent 2,676,923 describes one method of removing metal ions from hydrogen peroxide solutions by means of cation exchange resins which can be employed for this purpose but other suitable methods can also be used.

The invention is further illustrated by the following nonlimiting examples:

EXAMPLE I

The results obtained with two 100 milliliter resin beds (2.5 x 21 cm.) of "Dowex 1 x 7.5," a trimethyl benzyl ammonium poly(styrene-divinylbenzene) anion exchanger (20–50 mesh), demonstrate the efficiency of the method and illustrate its flexibility. One resin bed, bed A, was regenerated with 700 milliliters of a 5% by weight sodium bicarbonate solution and the other bed with about 800 milliliters of 5% by weight sodium carbonate solution. Through bed A, an impure aqueous 16% by weight hydrogen peroxide solution about 0.065 N in carboxylic acids was passed at about 20° C. at the rate of 3 bed volumes per hour. The liquid was distributed over the beads in a film by a flow of air plus 5% $CO_2$ at the rate of 850 bed volumes per hour. Through the other bed, an impure aqueous 21% by weight hydrogen peroxide solution of similar acid content was passed at 40° C. at the rate of 7.5 bed volumes per hour. Liquid distribution was obtained with an inert gas, air, flow of 600 bed volumes per hour. Bed A removed 99% of the acid in the feed until some 83% of the ultimate capacity of the bed was saturated, at which time the acid broke through into the column effluent and the pH fell from 5.8 down toward that of the feed. In the other column, acid removal was 98% and bed utilization to breakthrough was 82%.

EXAMPLE II

Practice of the invention with hydrogen peroxide of high concentrations is demonstrated by two experiments conducted within a barricade by remote control. Conditions and results are shown in the table.

Table

| Hydrogen, Peroxide, percent weight | | Normality as Acetic Acid | | Flow Rates, Bed Volumes/Hour | | |
|---|---|---|---|---|---|---|
| Feed | Product | Feed | Product | Feed | Air | $CO_2$ |
| 70.87 | 70.40 | 0.007 | 0.000 | 8 | 525 | 30 |
| 90.34 | 90.13 90.63 | 0.011 | 0.000 | 8 | 375 | 30 |

The resin bed used was 100 milliliters of Dowex 1 x 7.5 (20–50 mesh). It was freshly regenerated before each run with a liter of 5% by weight sodium carbonate solution followed by a $CO_2$ wash to convert the resin to the bicarbonate form.

EXAMPLE III

Removal of a quite weak acid, peracetic acid, was achieved with a 100 milliliter bed similar to that employed in Example I. An aqueous 30% by weight hydrogen peroxide solution 0.078 N in acetic acid and 0.029 N in peracetic acid was passed through the bed at 9 bed volumes per hour with a concurrent flow of 600 bed volumes per hour of air. Total acid content of the column effluent was 0.002 N, showing that at least 93% of the peracetic acid had been removed.

EXAMPLE IV

Removal of benzoic acid, an aromatic carboxylic acid such as might be encountered in the purification of crude hydrogen peroxide derived from the oxidation of aromatic compounds, is effectively accomplished by the present invention. A 0.0202 N solution of benzoic acid in 30% by weight hydrogen peroxide was passed through a 100 milliliter bed of Dowex 1 x 7.5 in the bicarbonate form at a rate of 8.4 bed volumes per hour. An inert gas flow of 255 bed volumes per hour was used to insure liquid distribution on the resin. The product was less than 0.0001 N in benzoic acid, showing that a 99.5% removal was obtained.

EXAMPLE V

Removal of inorganic acids was accomplished in treatment of an impure aqueous 40% by weight hydrogen peroxide stream containing ortho and pyro phosphoric acids in addition to carboxylic acids. The treatment was carried out by passing the feed at 6 bed volumes per hour through a 1,500 milliliter bed (6 x 55 centimeter) of Dowex 1 x 7.5 in the bicarbonate form (20 to 50 mesh) at room temperature. Feed distribution over the bed was obtained with an air flow of 85 bed volumes per hour. No externally added $CO_2$ was used in this instance; pH of the column effluent was 5.2. The total phosphorus content of the feed was lowered from 176 to less than 1 milligram per liter by the treatment showing about 99.5% removal of the phosphoric acids. The carboxylic acid content was reduced from 0.123 N to 0.0006 N, also a 99.5% reduction.

EXAMPLE VI

Using a 72-inch bed of 6.25 inches diameter charged with "Dowex 1" anion exchange resin in bicarbonate form, a crude hydrogen peroxide solution obtained by liquid phase oxidation of isopropyl alcohol with molecular oxygen followed by distilling off the unreacted alcohol as azeotrope with water together with the acetone formed as by-product in the reaction, was purified under different conditions of operation. The crude solution contained 16% hydrogen peroxide and was about 0.08 N in carboxylic acids. The bed was operated both as a flooded bed and with liquid distribution aided by concurrent flow of added gas. The conditions used and the results obtained are shown in the following table.

TABLE

| Method of Operation | Flow Rates,[a] feed/hour | | | Normality Acid | | Percent Utilization of Resin Capacity before Breakthrough |
|---|---|---|---|---|---|---|
| | Liquid | Nitrogen | $CO_2$ | Feed | Product | |
| Flooded bed | 16 | 0 | 0 | 0.078 | 0.000 | 95 |
| | 33 | 0 | 0 | 0.081 | 0.000 | 89 |
| With gas distribution | 26 | 0 | 35 | 0.079 | 0.000 | 87 |
| | 22 | 475 | 25 | 0.077 | 0.000 | 80 |

[a] Superficial gas velocities, calculated for NTP.

From the foregoing it will be seen that the new process of the invention is capable of many applications. It is not restricted to the removal of the particular carboxylic, percarboxylic and inorganic acids whose separation is illustrated in the foregoing examples but can be successfully employed to remove from hydrogen peroxide any acid not more than about two pK units weaker than carbonic acid. As previously pointed out it is particularly advantageous in the purification of hydrogen peroxide made by partial oxidation of organic intermediates since aliphatic and/or aromatic carboxylic and/or percarboxylic acid impurities present in such acid can be efficiently eliminated by this new method. It is also useful for the purification of hydrogen peroxide containing such impurities recovered in the course of use of hydrogen peroxide solutions. Thus it provides an economical method for removing acid impurities from recovered peroxide bleaching solutions before reuse of the solution for bleaching or other purposes. Purification of excess hydrogen peroxide recovered from epoxidation, especially epoxidation of unsaturated fatty oils or fatty acids is another advantageous application of the process of the invention.

The invention is also highly effective in removing inorganic acid stabilizers such, for example, as orthophosphoric and pyrophosphoric acid stabilizers from hydrogen peroxide as is often desirable immediately prior to use of the peroxide in applications where the presence of the stabilizer would be disadvantageous. This is the case, for instance, with hydrogen peroxide used in certain types of rocket engines and other uses dependent on decomposition of the hydrogen peroxide. Still other acids which can be removed from hydrogen peroxide solutions in the same way include, for instance, sulfuric acid, nitric acid, tungstic acid, organic sulfonic acids, and the like. It will thus be seen that the invention can be varied widely and is not limited to the examples which have been given by way of illustration only. Nor is the invention to be restricted by any theory proposed in explanation of the improved results which have been obtained but only in accordance with the following claims.

We claim as our invention:

1. In a process for removing anion impurities from acidic impure hydrogen peroxide of about 10% to about 90% hydrogen peroxide concentration on a weight basis, and containing lower aliphatic carboxylic acid as an impurity, wherein the impure hydrogen peroxide is intimately contacted at a temperature not exceeding 40° C. under fluid flow conditions with an anion-exchange resin in bicarbonate salt form having functional quaternary ammonium groups attached to a copolymer of styrene and divinyl benzene, the improvement comprising dispersing said hydrogen peroxide over a bed of said resin in particulate form with a gas which is inert under the existing conditions admixed with carbon dioxide so the hydrogen peroxide solution passes in the form of a film downwardly through the bed of resin in contact with carbon dioxide containing gas under sufficient pressure to keep carbon dioxide dissolved in the aqueous hydrogen peroxide, and maintain the pH in the range of about 3 to about 8.

2. A process in accordance with claim 1 wherein hydrogen peroxide containing a minor amount of lower aliphatic carboxylic acid of the group consisting of formic and acetic acids is purified while maintaining a pH of 4 to 6.5 in the hydrogen peroxide solution at all times by means of the added carbon dioxide.

3. A process in accordance with claim 1 wherein the resin is regenerated after it has substantially lost its effectiveness for removing said acid from said aqueous solution by intimately contacting it with an aqueous sodium carbonate solution to substantially convert the resin to its carbonate form, washing the carbonate form of the resin with $CO_2$ to convert the resin at least in part to the bicarbonate form and again contacting the resin with hydrogen peroxide solution to be purified.

References Cited by the Examiner

UNITED STATES PATENTS

| | | | |
|---|---|---|---|
| 2,388,235 | 11/1945 | Bowman et al. | 210—37 |
| 2,485,485 | 10/1949 | Dudley | 210—37 |
| 2,591,573 | 4/1952 | McBurney | 260—88.1 |
| 2,658,042 | 11/1953 | Johnson | 210—37 |
| 2,772,237 | 11/1956 | Bauman et al. | 210—37 |
| 2,868,832 | 1/1959 | Taylor et al. | 210—37 |

FOREIGN PATENTS

| | | |
|---|---|---|
| 167,414 | 1/1951 | Austria. |
| 190,904 | 7/1957 | Austria. |
| 1,006,402 | 4/1957 | Germany. |

OTHER REFERENCES

Latimer et al.: "Reference Book of Inorganic Chemistry," 3rd edition, 1951, pages 285–286.

Wheaton et al.: "Industrial and Engineering Chemistry," vol. 43, No. 5, pages 1088–1093, May 1951.

OSCAR R. VERTIZ, *Primary Examiner.*

MAURICE A. BRINDISI, *Examiner.*

M. WEISSMAN, M. N. MELLER, O. CRUTCHFIELD,
*Assistant Examiner.*